(12) United States Patent
Herz et al.

(10) Patent No.: US 7,350,069 B2
(45) Date of Patent: Mar. 25, 2008

(54) SYSTEM AND METHOD WHICH EMPLOYS A MULTI USER SECURE SCHEME UTILIZING SHARED KEYS

(76) Inventors: Frederick S. M. Herz, 2169 Crestwald Ter., Warrington, PA (US) 18976; Yael Gertner, 1512 Country Lake Dr., Champaign, IL (US) 61821; Craig H. Martell, 294 Paseo Cularte, San Juan Bautista, CA (US) 95045; Sampath Kannan, 1107 Spruce St., Philadelphia, PA (US) 19107

( * ) Notice: Subject to any disclaimer, the term of this patent is extended or adjusted under 35 U.S.C. 154(b) by 520 days.

(21) Appl. No.: 10/418,983

(22) Filed: Apr. 18, 2003

(65) Prior Publication Data

US 2006/0059347 A1 Mar. 16, 2006

Related U.S. Application Data

(60) Provisional application No. 60/444,743, filed on Feb. 4, 2003, provisional application No. 60/392,253, filed on Jul. 1, 2002, provisional application No. 60/373,405, filed on Apr. 18, 2002.

(51) Int. Cl.
H04L 9/00 (2006.01)
H04K 1/00 (2006.01)

(52) U.S. Cl. ............ 713/150; 380/277; 380/273; 713/171

(58) Field of Classification Search .......... 380/277, 380/273; 713/150, 171
See application file for complete search history.

(56) References Cited

U.S. PATENT DOCUMENTS

| | | | | |
|---|---|---|---|---|
| 5,150,411 A * | 9/1992 | Maurer | ................ | 380/30 |
| 5,159,634 A * | 10/1992 | Reeds, III | ................ | 380/42 |
| 5,483,598 A * | 1/1996 | Kaufman et al. | ................ | 380/43 |
| 5,764,767 A * | 6/1998 | Beimel et al. | ................ | 713/180 |
| 5,838,792 A * | 11/1998 | Ganesan | ................ | 380/282 |
| 5,907,618 A * | 5/1999 | Gennaro et al. | ................ | 380/286 |
| 5,991,399 A * | 11/1999 | Graunke et al. | ................ | 380/279 |
| 6,091,819 A * | 7/2000 | Venkatesan et al. | ................ | 380/28 |
| 6,205,249 B1 * | 3/2001 | Moskowitz | ................ | 382/232 |
| 6,307,936 B1 * | 10/2001 | Ober et al. | ................ | 380/30 |
| 6,445,794 B1 * | 9/2002 | Shefi | ................ | 380/46 |
| 6,449,720 B1 * | 9/2002 | Sprague et al. | ................ | 713/171 |
| 6,628,786 B1 * | 9/2003 | Dole | ................ | 380/44 |
| 6,795,555 B1 * | 9/2004 | Parisien et al. | ................ | 380/47 |
| 6,834,112 B1 * | 12/2004 | Brickell | ................ | 380/279 |
| 6,868,495 B1 * | 3/2005 | Glover | ................ | 713/190 |
| 6,891,952 B1 * | 5/2005 | Puehlhoefer et al. | ................ | 380/262 |

(Continued)

Primary Examiner—Emmanuel L. Moise
Assistant Examiner—Techane J. Gergiso
(74) Attorney, Agent, or Firm—Woodcock Washburn LLP (57) ABSTRACT

We propose a multi user information theoretically secure scheme. Our scheme allows any two parties in a multi user system to exchange messages securely using encryption, and to sign messages. Our scheme achieves a significant saving in the number of total keys in the system and in the keys each user must store. The encryption, and signing algorithms proposed in the scheme are as efficient as possible. Our scheme is designed so that it is possible to easily and efficiently revoke and add membership of new users into the system. It is also designed so that authentication and security against man in the middle attacks can be added at low cost. In addition, we introduce a novel and efficient way to use steganography for key replenishment.

34 Claims, 3 Drawing Sheets

U.S. PATENT DOCUMENTS

| | | | |
|---|---|---|---|
| 6,917,685 B1* | 7/2005 | Watanabe et al. | 380/262 |
| 6,963,976 B1* | 11/2005 | Jutla | 713/181 |
| 6,980,649 B1* | 12/2005 | Batcher | 380/42 |
| 7,043,024 B1* | 5/2006 | Dinsmore et al. | 380/278 |
| 7,065,215 B2* | 6/2006 | Shirakawa et al. | 380/277 |
| 2002/0002675 A1* | 1/2002 | Bush | 713/160 |
| 2002/0090091 A1* | 7/2002 | Ng et al. | 380/286 |
| 2003/0026431 A1* | 2/2003 | Hammersmith | 380/277 |
| 2003/0112972 A1* | 6/2003 | Hattick et al. | 380/46 |

* cited by examiner

SYSTEM AND METHOD WHICH EMPLOYS A MULTI USER SECURE SCHEME UTILIZING SHARED KEYS

CROSS-REFERENCE TO RELATED APPLICATIONS

The present application claims priority under 35 U.S.C. § 119 to prior U.S. Provisional Applications 60/444,743, 60/392,253, and 60/373,405 filed Feb. 4, 2003, Jul. 1, 2002, and Apr. 18, 2002, respectively. The contents of these applications are incorporated herein by reference.

BACKGROUND OF THE INVENTION

1. Field of the Invention

The present system and method relates to secure communications, system security and cryptography. A particular emphasis is placed on has cryptographic solutions based upon Public Key Infrastructure (Pki) based methods.

2. Description of Related Art

In order to communicate securely over an insecure communication channel one needs to encrypt messages. Such encryption schemes fall into two broad classes—private key schemes and public key schemes. In a private key encryption scheme the Sender and the Receiver share a secret key K. This key is used both to encrypt and to decrypt the message. In a public key encryption scheme the Receiver has a pair of related keys—a secret key and a public key. He reveals his public key to everyone. To send a message to Receiver, the Sender encrypts it using Receiver's public key. Under certain assumptions (explained below), only the holder of the secret key, i.e., Receiver, can decrypt the message using a feasible computation.

When using a private key encryption scheme it is necessary for each pair of communicating parties to agree on a shared secret key before encrypted communication begins. In settings where the parties know each other and expect to communicate in the future this can be established quite easily. For example, such a setting might work for a communication network within a company where the messages are sent between the employees of the company. All the employees know each other in the sense that they are all listed in the company pay-roll. Each employee can establish private keys when joining the company. In contrast, a setting where private key encryption may not be appropriate is a setting similar to the Internet where the parties do not have a way to get to know each other. In such settings, public key schemes offer immense practical advantages over private key schemes (with possibly only one novel exception, which is below described). In public key encryption each user simply has to publish his public key and keep his private key secret. No prior agreement is needed between the parties. Such considerations account for the enormous popularity of public key encryption schemes such as RSA over private key schemes.

However, from the standpoint of security, a particular private key encryption scheme called the one-time pad is the gold standard. In the one-time pad scheme, a secret key is a string of random bits and encryption is done by computing the exclusive-or of successive bits of the message with successive bits of the key. Decryption is done by computing the exclusive or of the bits of the cipher-text with the bits of the secret key. One-time pad schemes have the strongest possible security. As long as the secret key is not compromised, an eavesdropper who gets the cipher-text has no information that picks out the particular message transmitted over any other message. This is true even if one allows the attacker to have unlimited computational resources. Such a level of security is called perfect security or information-theoretic security and refers to the fact that it is the absence of information (about the message in the cipher-text) and not the computational prowess of the attacker that limits her. As the name implies, the key in a one-time pad is meant to be used just once and the key must have as many bits as the message transmitted. This is well suited for applications where the users know in advance the approximate size and number of messages they plan to exchange in a give time. In such applications the users are able to determine the appropriate size of the secret key they need to share before communication begins. On the other hand, in applications where the size of the key cannot be determined ahead of time, using the one time pad scheme would require either exchanging a very large key with the possibility of never using much of it, or exchanging a shorter key with the possibility of ending the encrypted communication before the entire message got transmitted. Therefore, for these applications public-key schemes might be more appropriate.

Unfortunately, there are no perfectly secure public-key schemes. Public-key schemes are not secure if the attacker is given unlimited computational resources. An attacker can simply run through all possible secret keys, see which one is related to the public-key, and then use this secret key to decrypt the message. To obtain a public-key scheme one makes a computational assumption—that decryption is difficult for an attacker who can only perform probabilistic polynomial time computation. For example, in order to show that the RSA public key encryption scheme is secure, one needs to assume that factoring large integers is hard. (In fact, this assumption is necessary but not sufficient to ensure the security of RSA.) Thus, while public-key encryption offers logistic advantages, schemes based on this idea are vulnerable if the attacker has enormous resources at her disposal or the underlying assumption about the hardness of some computational problem turns out to be false. It has been shown that on a quantum computer the factoring problem can be solved efficiently. Thus, the security of RSA rests on our inability to build quantum computers—not a satisfactory state of affairs for long-term, high-security communication.

A second drawback of public-key encryption is the computational cost of the encryption and decryption operations. Schemes such as RSA use large moduli (typically at least 500-bit) and have to compute expensive operations such as exponentiation with respect to such moduli. In contrast, a one-time pad uses the very fast operation of bitwise exclusive-or.

To summarize, the one-time pad private-key encryption scheme achieves the best security possible and essentially the fastest possible computation—bitwise exclusive-or. As mentioned above it is most appropriate for applications when the Sender and Receiver are able to to establish a private-key. The one-time pad scheme can also be extended to scenarios where there are many pairs of senders and receivers. In such a scenario, each pair of Sender and Receiver shares its own private key. This means that each Receiver must keep as many keys as there are parties that send messages to it which can become rather costly.

Therefore, when the one-time pad scheme is extended to applications where there are many parties it does not scale well.

BRIEF SUMMARY OF THE INVENTION

A system and method is herein proposed in which its preferred embodiment is described. The design of this preferred cryptographic scheme is based upon the use of random data strings for coding communications and it is thus capable of achieving an equivalency of data security which is theoretically unsurpassable and thus equal to that of a one time pad (i.e., the term herein used for this level of "information theoretic" security refers to the complete absence of data by a would-be interceptor). In addition, it requires an optimally minimal amount of computational overhead. Memory requirements associated with key distribution and replenishment are minimized as a consequence of the scheme's ability to utilize completely random strings for the message coding as a result of being able to maximize the quantity of the associated data, which constitute the key sets. This advantage is provided through a novel means through the sharing of its associated digital components between the various different keys residing with any given user in the community of potential correspondents. Some of the significant system advantages include efficiency in key revocation and an increasingly diminished risk of vulnerability to unauthorized key seizure by any potential rogue attempts on the part of colluding members (or previously revoked members) in direct proportion with the total size of the community. In this application, the general problem of data and data communication security within the context of addressing are explored to provide a system and method to address certain important concerns and issues based upon the following system level objectives:

1. Maximizing the inherent security of the cryptographic method that is information theoretic secure and thus meets the criteria for the strongest possible security theoretically achievable (equivalent to that of one time pad methods);

2. Minimizing overhead costs such as computational overhead for which the invention offers the lowest possible computation requirements;

3. Minimal storage of keys so as to maintain memory requirements within manageable limits. Accordingly, the invention minimally reduces the size of the random number of keys (or pads) by sharing the data inherently contained within each unique key used to communicate with each unique member of a community. Thus, the term "shared set keys" is applied.

4. To minimize the inefficiency associated with key revocation. Unlike traditional one-time pads the invention enables each member who wishes to cancel the community membership of a revoked user to simply revoke the key for that user on his or her system.

5. To minimize the likelihood of risk of collusion by rogue attempts of members (or previously revoked members) to attempt to combine their keys in order to identify (and thus break) the key pairs associated with those of other communicating members who would otherwise desire to communicate privately;

6. To achieve information theoretic secure authentication and digital signatures as would be achievable using similar advantages and efficiencies associated with the preferred cryptographic method;

7. To enable communities of users in which any user is able to very flexibly and efficiently communicate with any other user, any combination of users, or potentially all users in the community such that the establishment of the desired communicating members is absolutely secure with respect to those desired members;

8. To provide a method that possesses substantial redundancy by virtue of its highly distributed nature and in this way is minimally vulnerable to any single point of attack whether it be physical or within the confines of the network environment;

9. To provide efficient means for replenishing used keys. Although a method using steganographic techniques is provided in detail and possesses distinct advantages, any number of other possible techniques may exist each with a potentially unique suite of benefits and tradeoffs.

10. To provide, within the present preferred method, a variety of tunable parameters which can be controlled and thus customized to advantageously meet the particular needs of security and efficiency at a variety of levels based upon the associated best matching benefits and tradeoffs for the particular needs which characterize the context of the particular situation.

11. To create a scaleable system which can adapt to increasing numbers of users per community and/or where the community itself could potentially be as large as the totality of Internet users.

To accomplish these objectives, the invention provides an information-theoretic (perfectly secure) private-key encryption scheme designed for a community of users with some commonality of interest. Much greater efficiency is achieved than the one-time pad method when extended to many parties. This is achieved while maintaining the information-theoretic security of the message with respect to an eavesdropper from outside the community but sacrificing security when there are large coalitions of colluding parties within the community. That is, within the community, if a coalition of sufficiently many members collude, they can together decrypt the cipher-texts exchanged by a pair of sender and receiver.

Application scenarios are envisioned where such malicious collusion between members of the community is extremely unlikely to occur and for such scenarios the invention is perfectly secure. The level of security versus efficiency can be captured by the parameter S which is the threshold representing the minimum number of colluding members needed to cause this kind of insecurity.

Parameter S is a design parameter and can be chosen over a wide-range of values, representing a wide spectrum of trade-offs between efficiency and security. However, as is explained in further detail herein, regardless of what level of efficiency or security is deemed necessary, this overall level of compromise in security becomes relatively smaller in relation to the overall number of users on the system. As can be readily imagined, this specific feature of the method as proposed is an extremely important one for enabling it to be potentially more scaleable for purposes of extending the practical utility of at least certain implementations of the system to potentially increasingly large numbers of users. Such scalability advantages would represent a substantial advancement over pre-existing private key systems.

Assuming that there are no large coalitions, the security offered by the invention is comparable to the security offered by the one-time pad scheme and does not rely on assumptions about the computational limitations of the attacker. As an example of an important situation where collusion between many parties should not occur, suppose one has an on-the-field communication network between several friendly agents operating in hostile territory. It is possible that one or more of the communication devices falls into enemy hands, but it is unlikely that a large number of them will fall into enemy hands before some kind of recovery action is taken. Each captured communication device can be viewed as a "colluding" party and the argument above says that there will not be too many colluding parties. This and other potential application scenarios are more fully described herein.

The invention achieves significant savings over one-time pads in the number of keys to be remembered by each member of the community. These effects become enormous as the number of community members increases. In a community of N users, if one uses a pure one-time pad scheme, each user has to remember N−1 keys, one for each other user. Overall, the system has about N-squared keys. In the present invention, the total number of keys in the system is reduced to about N and the number of keys per user to about C times the square root of N where C is a tunable parameter.

Another advantage of the invention to that of one-time pads or any other previously available cryptographic scheme is that in the method of the invention it is possible to achieve security equivalent to one-time pads while also enabling the conditions by which it is possible for keys for any member in the group to be revoked by a coalition of other members. By contrast, one time pads lack this desirable property and only allows either the Sender or Receiver of the message itself to revoke their own key.

DETAILED DESCRIPTION OF THE INVENTION

Figure 1:
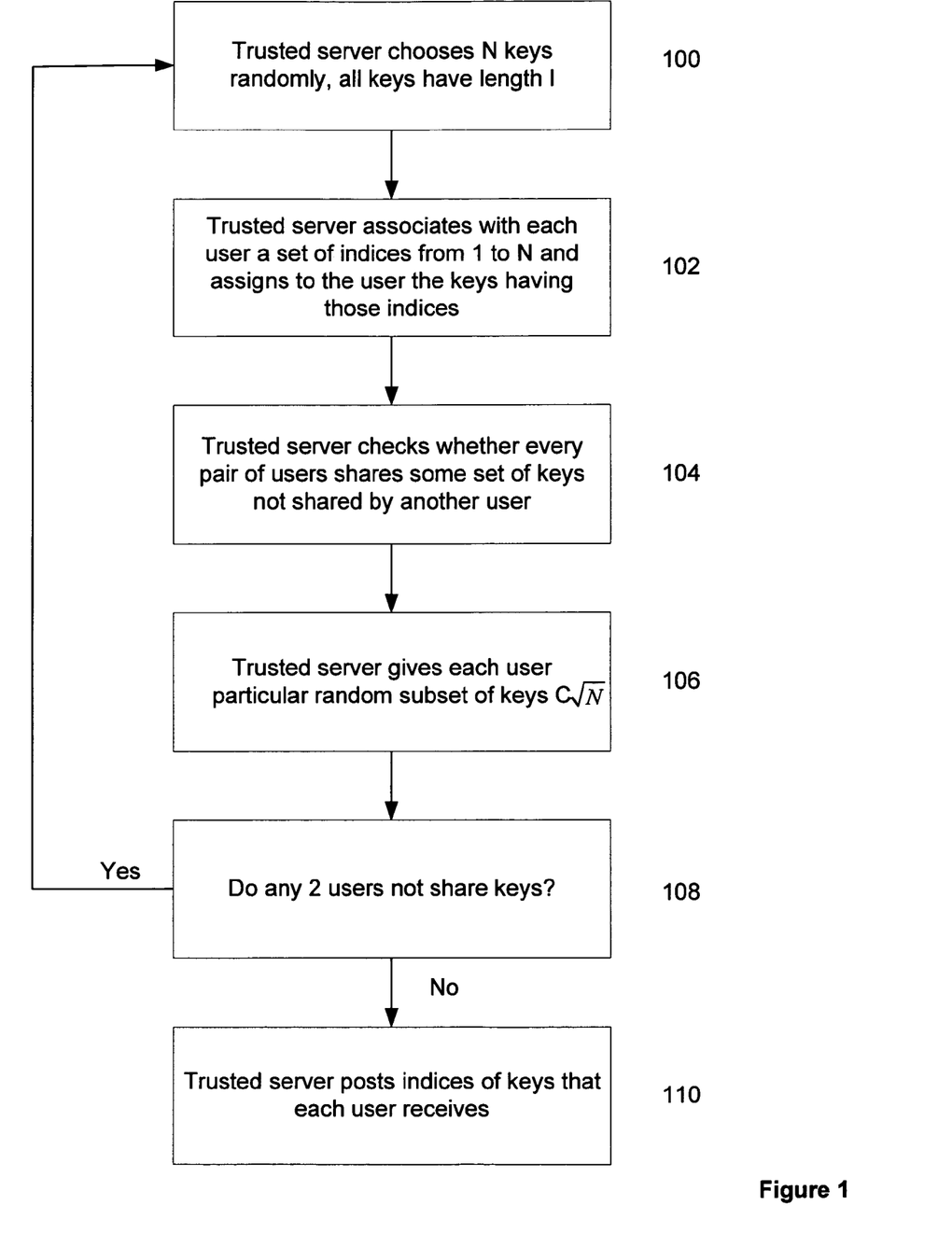
FIG. 1 illustrates key assignment in accordance with the invention.

The invention allows M users to communicate with each other securely. FIG. 1 illustrates key assignment in accordance with the invention. As illustrated, a trusted server chooses N keys K_1, K_2 . . . K_N randomly such that all keys have the same length l (100). The trusted server assigns to each user a random subset of the N keys of size approximately C times the square root of N. To be more precise, the trusted server associates with each user a set of indices from 1 to N and assigns to the user the keys having those indices (102). It checks to see whether every pair of users shares some set of keys which are not shared by another user (104). The server then gives each user the particular random subset of size C times the square root of N assigned to it (106). In the unlikely event that two users do not share keys (See appendix), the server does not distribute the keys and starts the process of key assignments from the beginning to decide which new subset should go to which user (108).

Using probabilistic analysis, it is possible to show that any pair of users will share about C keys. However any other small subset of users is extremely unlikely to possess all C keys. Only large coalitions of colluding parties can obtain all C keys and break the security of the communication between two users.

After the key distribution is completed, the trusted server posts the indices of the keys (not the keys themselves) that each user receives (110). In order to post the information the trusted server can send the information to all the members. Alternatively the server can place it on a bulletin board or the web and all the users can access that information when they need it.

Figure 2:
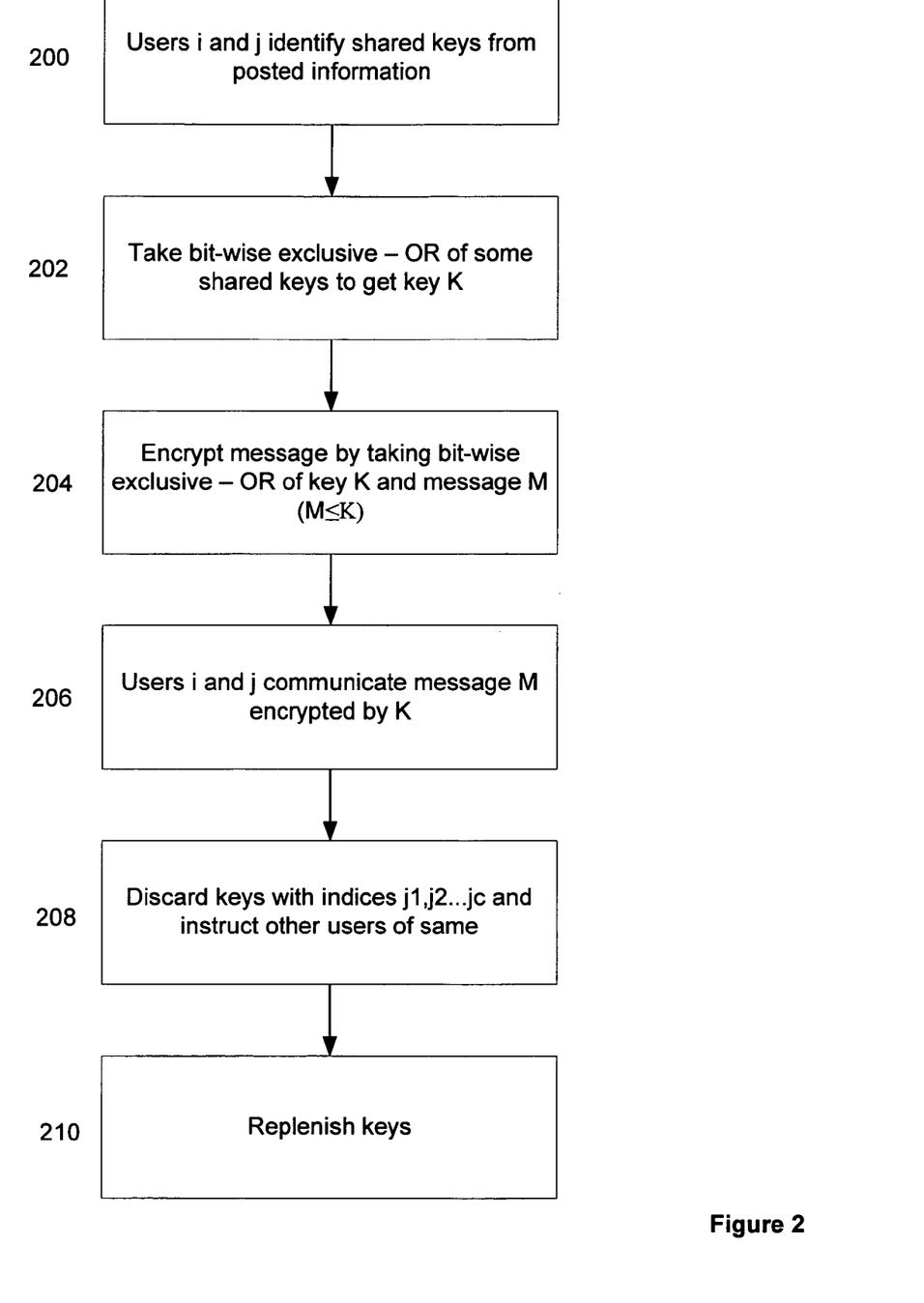
FIG. 2 illustrates communication between users i and j using shared keys in accordance with the invention.

As illustrated in FIG. 2, if users i and j want to communicate, they identify the keys that they share from the information posted about the indices that they share (200). They then take the bitwise exclusive-or of some of the keys they share to arrive at a key K which they use as a one-time pad (202). To encrypt a message they take the bitwise exclusive-or of the key K and the message m (204). Therefore, the length of the message must be equal to or smaller than the length of the key K.

If users want to exchange a message of size larger than the key K then they can split the message into several components each of the size of the key and encrypt each component using a different subset of the shared keys. If the message is smaller than the key then it can be padded with zeros before encryption.

After users i and j communicate using the key K constructed from their shared keys K_j1, K_j2, . . . K_jc (206) they discard the keys with indices j1, j2, . . . jc. They also post that the keys with indices j1, j2, . . . jc have been used and should be discarded by all users (208). This means that users i and j need to obtain new keys in order to communicate with one another. However, this should in most cases not affect the communication of other users. This is so, because as in the analysis of security the other users will normally have some other keys which they share.

The number of keys N that the trusted server chooses can be set to be of the order of M, the number of users. This number can be made larger depending on the level of security desired. It can also be set to be 2M if it is anticipated that additional users will be joining the system and the number of users is not likely to increase to more than double. This is described in more detail below.

All the keys need to be of the same length. The length l can be determined by the typical message size of each particular application. The scheme can be augmented so that for each pair of users multiple one-time pad keys are available. The keys can also be of different sizes so that the users can choose the appropriate key for the appropriate message size.

Depending on the desired security and reliability the trusted server can be replaced by several servers. For additional security, instead of storing the secret keys with one trusted server, shares of the secret can be distributed among several servers. For additional reliability, instead of storing the secret keys or the shares of the keys with one server those can be distributed among several servers. For further security the keys can be chosen and decided upon by a few servers rather than by a single trusted server.

When a new user is added to the scheme, the trusted server decides which random subset of size approximately C times square root of N of the existing N keys in the system will be given to this user. It then checks that this new user shares keys with each of the other existing users. If not, the server decides on a new subset of keys. This should happen only with negligible probability. The keys are then given to the new user. For security reasons the number of keys N should be larger than the number of users. As mentioned above, N will be chosen to be larger than M based on the expected number of users that will join the system. In the case that more users join and M is bigger than N, the server chooses another random key and distributes it to all the users such that each user will receive this key with probability C divided by square root of N. The server updates the posted information about which key indices are given to which user.

If a system decides to revoke the membership of a user for whatever reason, the keys (not just the indices) belonging to that user are posted so that they are no longer secret. By doing so this user can no longer send any private messages. This does not affect the security of the other users since they will have other keys to use which are still secure. Since a large coalition of users is able to obtain the keys of a particular user, in a case of emergency the members of the community can vote and decide to revoke the membership of a particular user. Note that this can only be done if the size of the coalition is large enough. Therefore, a user will not be revoked by some adversarial members but only by a legal vote.

After user i and user j used their shared keys k_j1, . . . k_jc, the keys with indices j1, . . . jc are discarded. These keys need to be replenished. The trusted server chooses new values for the keys with indices j1, . . . , jc in place of the old ones. The server distributes these new keys to all the users who received the keys with these indices (210). This key replenishment can be done in an incremental way, every time keys are discarded. Alternatively, the server can wait a period of time until a larger number of keys have been used and then replenish all of these. It can also be done based on a need basis. If users wish to communicate and they are missing keys the server can choose new keys and distribute them. The replenishment policy can be decided based on what is most appropriate for the application.

If the keys are always replaced, the size of the coalition S of adversaries always stays the same. Otherwise, the coalition size decreases as the keys get discarded. Again, the exact trade-off between security and frequency of key replenishment can be worked out based on the needs of the application.

The key distribution can be done by physical means such as distributing the keys in a disk, on a hard drive, or on various secure hardware depending on the size of the keys. The replenishment of keys can also be done by physical means. When keys need to be replenished as was elaborated upon above, a new disk or hard drive can be distributed to the parties that are in need of replenishment. This key replenishment may create a bottleneck in some applications in an otherwise efficient scheme. Therefore, an exemplary embodiment is provided for the sake of illustrating how to replenish keys more efficiently. However, this would result per the below illustrative example in somewhat reducing the level of security. Depending upon the needs of the present user and/or community, one other useful idea for the key distribution process (whichever method is chosen) is to distribute a miniaturized version of the shared set keys, also referred to later in this specification as "mini-keys". Of particular utility for this application could be a scenario in which there exist members of a large (or potentially large) group of communicants (which in its ultimate incarnation is comprised of potentially an Internet-wide community) in which there is a possibility (even potentially only a remote possibility) for the need to communicate with those parties, however, memory limitations restrict the practicality of distributing the standard size keys in conjunction with the present key distribution procedure. Subsequently, if a communication between any of these potentially communicating parties (possessing these shared-set mini-keys) becomes warranted, a key replenishment procedure could then be used. For example, implementation of a scheme such as the analog cryptography scheme, which is proposed below, would (depending upon the security needs and present scope of other available technical options) be one possible approach. It is, of course implicitly understood within this portion of the present disclosure that there may presently or eventually exist a range and diversity of other alternative methodologies for performing key replenishment (as well as potentially key distribution) in addition to the one described below which could achieve additional degrees of advantage in efficiency and/or security. In this way, the disclosure of the herein suggested key replenishment and distribution schemes are intended in no way to limit the range or scope of the presently inventive system and method as it is herein proposed. Therefore, the users can choose—depending on the particular application—whether they prefer to increase the efficiency or maintain the highest level of security.

Depending on the security requirements of the application, the information-theoretically secure method of physical replenishing of keys can be replaced by a pseudo-random generator which depends on a computational hardness assumption. The computational assumption it depends on is very weak and assumed by many to be reasonable. This assumption is so weak that it is believed to hold even if quantum computers can be built. Under this replenishment method, the server generates N random seeds S_1, S_2, . . . S_N, for the pseudorandom number generator and distributes these seeds to users exactly as in the earlier method. Each user uses the seeds s/he has to produce longer keys which s/he then uses in the same fashion as in the earlier method.

As another possibility for key replenishment is suggested a method that relies on an even weaker-assumption. This method would be beneficial when the cost of bandwidth is less expensive relative to the cost of computation. This method uses steganography in a novel way. Usually, steganography is the art and science of embedding a message in data so that an adversary will not be able to tell whether the data has a message embedded in it or not. Typically, a user will use data available from an outside source to be embedded the message. Therefore, the user will not have the privilege to choose the type of data used. For example, a worker in an office might want to send personal notes to another worker embedding the messages in the data files already distributed at the work place.

For the purpose of the key replenishing method of the invention steganography—embedding a message in data—is used in a novel way, as encryption. Therefore, unlike other steganographic methods it is not relevant to the method of the invention whether the adversary will be able to detect the existence of a message in the data. In fact, the data is sent only for the purpose of embedding, so all data streams will have messages embedded in them. Moreover, the data in the method of the invention could be created especially for the purpose of embedding messages in it. Therefore, one can choose the data yielding the highest security and efficiency. As in all private key encryption schemes, the message will be embedded in the data so that an adversary who reads the data will not be able to learn information about the message without knowledge of the secret key.

The data chosen for the key replenishing scheme is data produced from scanning color pictures, or data produced from color pictures taken on a digital camera. The reason this data is most appropriate for use herein is because in digital data encoding colors there are usually several data streams representing the same visual image. If these data streams representing the same image cannot be distinguished, the message can be embedded in such a stream which is randomly chosen from the set. Such a selection exploits the entropy available in such data to communicate specific messages without an eavesdropper being able to figure out what the messages are. Indeed, statistical tests which are typically used to break steganographic schemes do not perform well in breaking data scanned from color pictures. Moreover, since in the method of the invention the trusted party replenishing the keys can choose which pictures to scan, it can make sure to pick the pictures with the most variability in color which decreases the possibility of finding any statistical patterns in the data.

There are several ways to embed a message (e.g. fresh keys) in data. One good way is to embed it in the low order bits of the data. The size of the message will be small relative to the data. Therefore, not all the low order bits will have keys embedded in them and only a small fraction of them will. This again reduces the possibility of performing statistical attacks on the data, since most statistical attacks succeed only when a large fraction of the bits are used for embedding. In order to decide where in the data to embed the bits one can use a weak pseudo random generator.

Figure 3:
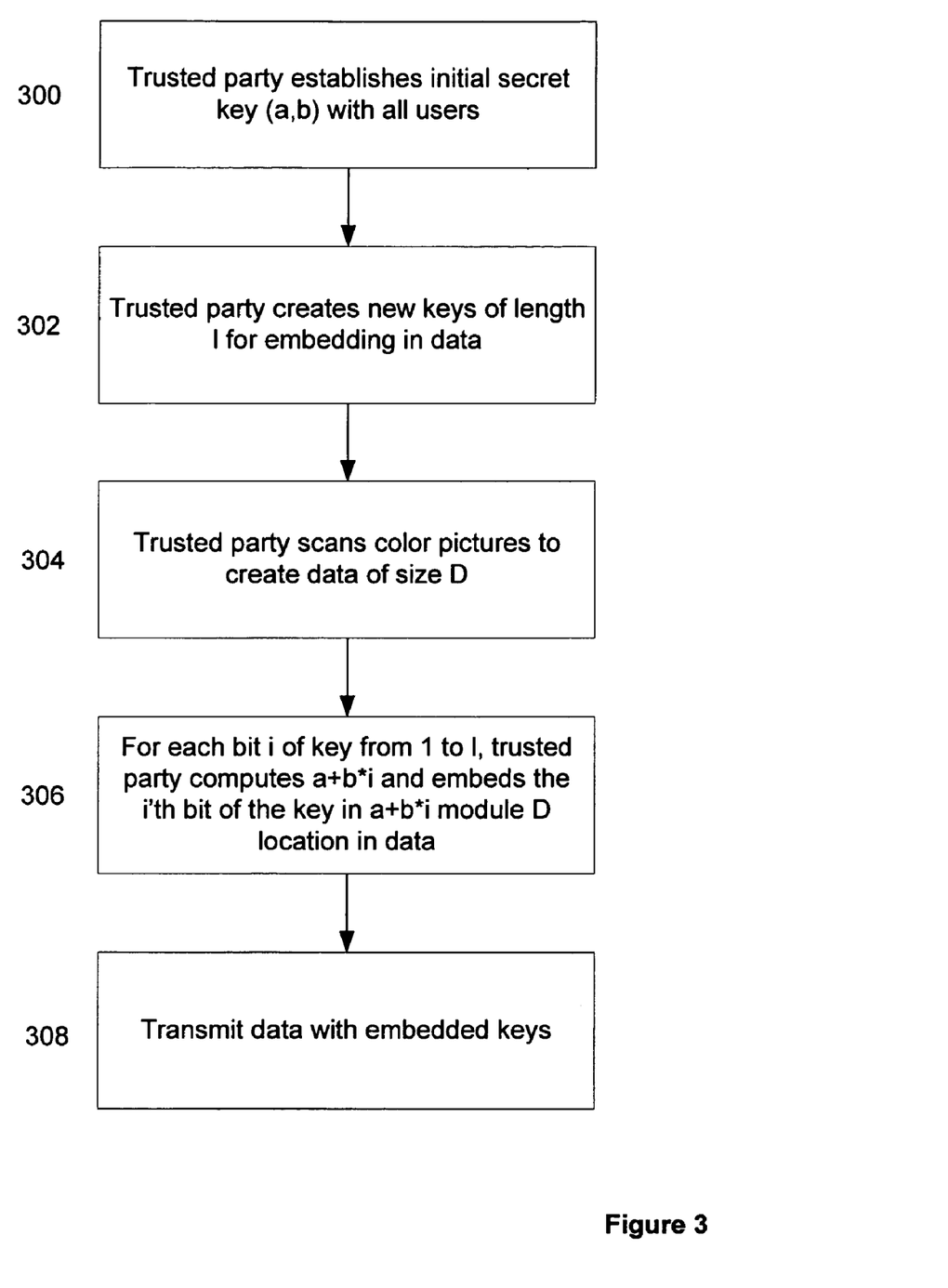
FIG. 3 illustrates embedding a message (fresh key) in data for distribution.

As shown in FIG. 3, this method works according to the following steps. The trusted party established an initial secret key with all the users in the system as was described above (300). The secret key will contain the keys a and b. Then the trusted party creates new keys of length 1 as described above to be distributed by being embedded in the data for the purpose of being used by the proposed information theoretic encryption scheme (302). In order to distribute the keys, the trusted party first scans color pictures to create the data of size D to be used only once (304). Note that for the purposes of security the size D can be made as large as desirable relative to 1 the size of the key. For each bit i of the key from l to 1, the trusted party computes a+b*i and embeds the i'th bit of the key in the a+b*i modulo D location in the data (306) and transmits the data with embedded keys (308).

This method relies on a much weaker pseudo random generator than the one that is obtained from the one way function assumption. The reason one is able to rely on a much weaker assumption is because the data itself has some randomness. The method of the invention is computationally secure in the following sense. If D is the length of the data stream, one considers O(D) to be feasible computation whereas O(D 2) to be infeasible. A user who knows a and b can look at the appropriate sequence of addresses and compute the message in O(D) time whereas an adversary who does not know a and b, has to consider all D 2 possibilities for the pair (a,b), look at the m messages that they give rise to and choose the "right" one. If the message itself is a random looking string, someone who does not know the right (a,b) pair cannot tell which of the D 2 possible messages is the right one. Moreover, in order to get more security, it is possible to replace D 2 by D 3 by using 3 seeds a,b,c and computing a+i*b+i 2*c for i=1, 2, . . . and similarly for higher powers. Thus, there is a tradeoff between the security and the efficiency of computation.

This method requires less computation than the previous method, which uses standard pseudo random generators. However, it does rely on the ability to send large amounts of data in an efficient manner. This quite likely is a reasonable assumption since bandwidth is turning out to be inexpensive whereas computation is still costly. In addition, scanning pictures is a task, that is easy and inexpensive.

The shared-set-keys method described herein is secure against an adversary, which tries to find information about the message. Therefore, the adversary cannot learn any information about the message itself. However, the adversary can still disturb communication by changing the bits of the cipher-text. This could result in the Receiver obtaining the wrong message. It is also possible for an adversary to resend a message to the Receiver pretending to impersonate the Sender. In order to prevent the above two types of attacks on the communications and at the same time preserve the unique highly advantageous benefits of the presently proposed encryption method, a special type of digital signature is implemented. In particular, a variation of the present shared-set encryption methodology is utilized that can be implemented as information theoretic digital signatures, which can be computed very efficiently and use a substantially minimized version of the present shared set key methodology herein referred to as mini keys. Depending on the security requirements, it is possible to design the signature method with keys as short as 1 bit.

The signature method is similar to the encryption method with a few modifications. In the key generation stage, the signature method requires random keys as in the encryption method. However, the keys here can be shorter, as short as one bit. Their length depends on how much security the application requires. In order to sign a message the Sender computes some function h on the message and then encrypts h(m) the output of the function. In order to verify, the Receiver decrypts the message from the encryption, computes the function h on m and checks whether the second encryption is equal to h(m). If they are the same the verification succeeded. Otherwise, the message was altered. The function h depends on the security level required. The most secure would be to use an error correcting code as h. This way the Receiver can detect and maybe even fix up to a guaranteed number of errors. If h is an error correcting code its output might be relatively long. If a shorter string is desirable it is possible to use a random hash function which will decrease the size exponentially. Another good candidate for h is the parity function whose output is only a single bit.

A strong motivation for the use of digital signatures is to ensure that the correct message was received. It is especially important for applications where the messages sent are codes. In such cases if the message is altered it might result in a program that runs erroneously which acts like a virus. Using the digital signatures it is possible to prevent using such erroneous code.

A motivation for such a signature scheme is its use as an authentication scheme. If the sender computes the function h as prescribed and then encrypts the output as well as the message using his secret keys, it is clear that no other user can perform the same task and the sender will thereby have established his identity.

The information theoretic authentication is perfectly secure. This means that the probability that an adversary can successfully forge is very small $-\frac{1}{2}^k$—for a key of size k. For example, if the size of the key is 100 bits then the probability that an adversary can break the scheme is $\frac{1}{2}^{100}$ which is a very low probability. The size of the key k is flexible and can be chosen based on the security needs of the application. For example, if for the purposes of the application it is enough to have a probability of breaking its security as 1 in 1,000,000 then the key can be chosen as size 20.

In the method of the invention, the size of the key can be chosen independently of the computing power of the adversary. On the other hand, in RSA like schemes, the size of the key depends on how powerful the adversary is. As the processing powers of an adversary increase, larger and larger keys will be needed to achieve a fixed level of security. The method of the invention is faster to implement than RSA but has greater storage requirements. However, the storage needs of the method are well within the capabilities of present day computers.

In addition, the method of the invention is also compatible with various compression techniques. Thus, it is possible to compress the message before encrypting to save on the number of key bits that are used up in each communication. One can also allow lossy compression whereby some information from the message is lost in the compression to further save on bits of the shared keys. In particular, if the current message is part of a sequence of messages between the two communicating parties, the receiver might be able to tolerate such information loss and recover the entire message from the context.

An important motivation for the method of the invention is that the encryption and decryption procedures are very efficient. Actually, they are as efficient as such procedures can be.

The system as described treats all the users as equals in the sense that they all can communicate with one another.

It is possible to modify the method so that the users in a hierarchy or onion community will be able to communicate according to the rules of the community.

In such a setting, users will have keys to communicate with members of their own group and people above them in the hierarchy.

It is possible to extend the method of the invention to a much more general setting where one is told which pairs of users will potentially communicate. One can model this setting with a graph where the nodes are the users and edges are drawn between two nodes if the corresponding users are potential communicators. This will be referred to as the communication graph. Before key distribution, the trusted server will perform an analysis of this graph.

Rather than distribute each key to a random subset of the users, the server will distribute each key randomly in a localized region within the communication graph. This produces a version of the method where a user who potentially communicates with k other users needs only about the square root of k keys. The total number of keys in the system will still be about N, the number of users. However, the above improvement in the number of keys each user needs to remember, opens up the possibility that the method could be adapted to work on much larger communities, such as the entire Internet. If N is the number of users on the Internet, it would be impractical for a user to have to remember about square root of N keys which need periodic replenishment. However, given that users on the Internet do not at present have a compelling need to securely communicate with everyone else, one can greatly reduce the number of keys each user needs to remember using the above approach. Other variations for optimally reducing the total number of keys in the system could, of course, be utilized without departing from the spirit of the claimed system and method. For example, U.S. Pat. No. 5,754,939 describes a probabilistically based method which could be readily adapted for the end objective of predicting which users will likely communicate with which users and/or which servers and with what frequency in a probabilistic (and/or predictive fashion) and conversely which users and/or servers a given user with high level statistical confidence not likely to establish a communications connection. Thus, the above approach could be replaced by that which is presently disclosed.

Undoubtedly, an Internet wide implementation of the present method utilizing the above-described variation of mini-keys may be implemented such as for implementing extremely high efficiency and extremely secure authentication and digital signature capabilities which are, of course, of an information theoretic secure nature.

One other application for such a widespread distribution of mini-keys is previously described and essentially leverages this particular variation of the present method to allow the shared mini-keys to instead (or in addition) assume the role of and thus achieve the initial key distribution itself. The only difference in this scenario to achieve that of standard shared sets is prior to establishing communication, connection with another party possessing appropriate matching shared-set mini-keys is that key replenishment would have to be performed (a distinct advantage for most applications rather than having to perform initial key distribution in de novo fashion).

Example Uses of Distributed Shared Keys Technology

Uses for this technology include, but are absolutely in no way limited to, situations where some fairly stable-sized group within a larger population wishes to have pair-wise secret communication among themselves. What follows are three examples: Private Communication within a Corporation/Organization's IT Infrastructure; Safer Virtual Private Networks (VPNs); and Mobile Military Communication Networks. In all of these cases the initial key-sets of each of the individuals in the communication group can be pre-distributed into the communication devices used.

EXAMPLE

The trusted party chooses N keys $K1, K2, K3, \ldots, KN$ and distributes them to the M users $U1, U2, U3, \ldots, UM$. Each user gets a subset of the N keys. Any two users share a subset of keys.

Below is an example of how the keys can be distributed for a community of 4 users.

|    | K1 | k2 | K3 | K4 |
|----|----|----|----|----|
| U1 | x  | x  | x  |    |
| U2 | x  |    | x  | x  |
| U3 |    | x  | x  | x  |
| U4 | x  | x  |    | x  |

In this example the trusted party generates the random keys k1, k2, k3, k4.

It then distributes the keys as follows: the user U1 gets the keys k1, k2, k3; the second user U2 gets the keys k1, k3, k4; the third user U3 gets the keys k2, k3, k4; the fourth user U4 gets the keys k1, k2, k4.

If U1 and U2 wish to communicate they create a key computing the exclusive—or the keys they share k1 and k3. Note that the other users U3 and U4 alone cannot find out the key used by U1 and U2 because each lacks information. U3 does not know k1 and U4 does not know K3. Only if U3 and U4 collude then they will be able to find both k1 and k3 and compute the key used by U1 and U2. It is easy to see that this is the case for keys computed between any pair of users.

In this example the size of an illegal coalition is small (two users). This is so because the number of users in this example is so small. However, when the number of users M increases the coalition size increases as well.

The method requires N=M keys. (When M=4 the number of total keys is 4). The number of keys each user keeps is roughly square root of M (When M=4 the number of keys is 3). In this example the number of keys each user keeps is relatively close to the total number of keys. This is so because the number of users in this example is so small. However, when the number of users increases the number of keys is proportionally smaller.

To illustrate the efficiency of this scheme, we compare this with what can be achieved for the same number of users M=4 when using an extension of the one-time pad scheme.

The one-time pad scheme would require N=M(M−1)/2 keys (When M=4 the number of keys is 6). The number of keys each user keeps is M−1 (When M=4 the number of keys is 3)

| User\Keys | K1 | K2 | K3 | K4 | K5 | K6 |
|---|---|---|---|---|---|---|
| U1 | x | x | x |   |   |   |
| U2 | x |   |   | x | x |   |
| U3 |   | x |   | x |   | x |
| U4 |   |   | x |   | x | x |

In the inventive method there are less overall keys (M compared with M(M−1)/2). In the inventive method each user stores less keys (square root of M compared with M−1). As M gets larger the savings become more significant.

Private Communication within a corporation/Organizations' IT Infrastructure. Currently, within an organization, computers on the same network can easily partake in peer-to-peer networking. The communications among the members of this network can be protected to some degree by having a firewall separate the organization as a whole from the rest of the network population (i.e., the Internet). However, there are at least two safety issues not addressed in this current set up. First, if the firewall is compromised, all interactions (including both data transfer and communications) become vulnerable. Second, Even assuming the inviolability of the firewall, internal communication and data transfer are vulnerable to interception by other members of the group.

Distributed Shared Keys solves the first of these problems by allowing for easy encryption of all data-transfers and communications, thus allowing for another safety in the case of infiltration from the outside. It solves the second of these problems by allowing for pair-wise encrypted communication and data-transfer between any two members of the group. Thus, even if the firewall stands, communications and data transfers between Alice and Bob, who both work at the same company, can never be overheard by Eve, who also works there. This could all be done transparently by embedding the keys in each of the employee's computers. The IT staff can periodically update the key sets as new members arrive, or old members leave. The user can be totally unaware of the workings of the encryption—unlike with public/private key schemes. Public key cryptography has not been the success that it was predicted to be, partly because it required the end user to manipulate a fairly large set of public keys before sending an encrypted message.

EXAMPLE

Corporate Virtual Private Networks (VPNs). "Virtual Private Network" is a fairly ambiguous phrase to describe the attempt to organize spatially disparate computers into a network for secure communications using existing public, and therefore insecure, networks (i.e., the Internet). An example would be using encrypted communication between the notebook of a traveling salesman and the home network. Another would be the series of connections necessary to allow a group of telecommuters to act as a work-group and securely share communications and data. However, many of these technologies are dependent upon public/private key methods for the security of their communications. The problems with public/private key methods are described above. Of note is that they will be susceptible to cracking with the advent of quantum computation. Since Distributed Shared Keys is comparable to the security of one-time pads, a VPN based on it is far more secure than current implementations. The key-sets could easily be embedded in the mobile users' computer to allow for seamless connection to the VPN.

EXAMPLE

Mobile Military Communications Network. A very important possible use of Distribute Shared Keys is an on-the-field military communications network. It is not difficult to imagine groups of soldiers engaged in action needing fast, absolutely secure communications among themselves. In addition, it would be advantageous for the chain of command structure if sometimes many of those communications were not able to be intercepted even by other soldiers in the group. For example, a captain may want to securely talk to each of the lieutenants without the sergeants or privates being privy to the discussions. Often, there will be discussions of different options, each with their own trade-offs concerning loss of life, etc. It could be demoralizing to the foot soldier to have such discussion to be overheard. And, obviously, the entire communication of the group should be kept secret from the enemy. Using Distributed Shared Keys, pre-embedded in the communication devices of the group, there could be save group communication, as well as secure pair-wise communication. As aforementioned, this would give mobile military communications the security of one-time pads with the easier key distribution. As long as no more than C (see above) communicators fell into enemy hands, the communications would remain secure.

The three examples given are all of the format such that the group using Distributed Keys is a stable-sized subset of the whole population and there are, of course, numerous other example application domains in which the advantageous properties of the present method are highly desirable (e.g., government organizations in which different types of information are frequently passed between different individuals or groups each possessing very uniquely different criteria for accessibility and secrecy with regards to any given communication or series thereof). However, this is not to rule out the usefulness of Distributed Shared Keys as a cryptographic technique used for the entirety of a population or for a subgroup whose size is dynamically changing and even the rapid reductions continuing to occur in costs for memory resources. The present method certainly could eventually become appropriate for incorporation into standard encryption and even security protocols for the Internet.

The network infrastructure can be built to include a subnetwork comprised of highly secure links. If this is done, the key replenishment can be solved using this subnetwork. A user who needs his/her keys replenished accesses the highly secure subnetwork, authenticates him/herself to the trusted server and obtains a fresh set of keys. As a possible embodiment access points for a highly secure subnetwork made up of optical fiber links (such as could eventually become achievable through present advances in all optical networking technologies) could be provided at points of high public traffic such as grocery stores or shopping malls such as via kiosk terminals through which highly secure access to downloadable keys could be provided in asynchronous fashion to their use at a later time, i.e., over networks possessing an inherently lower degree of security. Given a satisfactory user identification means for the present level of security required, the present approach could be used as well for performing the actual distribution of keys.

Other Applications Relevant to the Emergent Technical Advances in Quantum Cryptography As briefly explained above the presently proposed method's ability to provide quantum secure cryptographic protection will be potentially a much more critical and indispensable advantage than those which it provides in the present pre-quantum world. However, arguments have been made within the technical community that once the parallel but related field of quantum cryptography matures to the point of practical engineering feasibility the need for data transmitted over highly secure (quantum cryptography secured) optical connections, there will be less of a need to actually encrypt the communicated messages themselves in as much as it will then be possible to detect an eavesdropper anywhere along the line of the transmission. With regards to the above assertion, there is an issue on which the method of the invention impacts. Although the detection of an eavesdropper becomes possible over a quantum cryptographically secure communication channel, the fact remains that certain data is still likely to become intercepted by the eavesdropper in the process of the detection. Particularly, if all of the data is very sensitive, risk of such a potential event may be unacceptable. To prevent this, it is possible to use the secure channel to first pre-send the keys, validate that the keys had not been intercepted, then send the message itself in the one time pad encrypted form which is disclosed herein. In order to counteract any undesirable latency effects (such as might be encountered particularly noticeably in conjunction with transmissions from live data feeds) such key/message transmissions could be broken up into smaller sub-segments and which, thus could be transmitted in very frequent sequentially alternating periodic intervals in which these smaller key segments if allowed by their appropriately corresponding encrypted message segments.

In accordance with almost all other types of encryption methods (i.e., which include all cypher based encryption techniques) the high computational overhead associated with such security measures may influence the sender not to encrypt the message at all. While the increasing computational power in the future will tend to reduce the computational burden of decrypting a given size cipher text, it is anticipated that the above concern will only increase as cryptoanalytic tools in the hands of would-be attackers increases and accordingly drives up the overall relative computational overhead burden. This effect is expected to become particularly significant as quantum processing becomes a practical reality. By contrast, the method of the invention is not subject to the above concerns.

CONCLUSION

In conclusion, the encryption method proposed here achieves perfect security (information theoretic). It achieves a significant saving in the number of keys used relative to the extension of the one-time pad method. The encryption and decryption algorithms proposed in the method are as efficient as possible. The method is designed so that it is possible to easily and efficiently revoke and add membership of new users into the system. It is also designed so that authentication and security against man in the middle attacks can be added at low cost. In addition, a novel and efficient way to use steganography is introduced for key replenishment.

APPENDIX

1. In this section, the probability that two users in the scheme Ui and Uj share m keys after the trusted party distributes the keys are calculated.

Consider two users Ui and Uj:

Let Xi be a random variable which is equal to 1 when both users Ui and Uj receive the ith key, and 0 otherwise.

$Pr[Xi=1]=(c^2)/n$, since each key is given to the users with probability $c/(n^{1/2})$ Let X=Sum Xi, which is the number of keys both parties have in common.

The expected value of X $E[X]=E[Sum\ Xi]=Sum\ E[Xi] =Sum\ c^2/n=c^2$.

We want to calculate the probability that the users share at least m keys, $Pr[X>m]=1-Pr[X<m]$ The Chernoff bound gives us:

$Pr[X<(1-k)*c^2]<e(-c^{2k'}/2)$

To get $m>(1-k)*c^2$ we set $e(-c^{2k'}/2)<1/poly(n)$ $c^{2k'}/2>log(poly(n))$ solving for k we get $k^2>2\ log\ poly(n)/c^2$.

2. In this section we calculate the size of a coalition S which cannot break the encryption.

Prob[A coalition of size k does not have all $m$ of $m$ keys]=

Prob[Each member of a coalition of size k does not have at least one of m keys]=m*

Prob[Each member of a coalition of size k does not have a key]= m*(Prob[A member does not have a key]) k=
$m(1-c/n^{1/2})$ k

Solve this for k:

$m(1-c/n^{1/2})k=1$ {Using $1+x<e^x$}

$m*e(-kc/n^{1/2})>1$.

$log\ m+-kc/n^{1/2}>0$ $k<n^{1/2}*(log\ m)/c$

3. In this section we calculate the size of a coalition S which cannot break the encryption after a set of keys was thrown away.

The analysis is similar.

We now have $k<n^{1/2}*(log\ m-l)/c$ where l is the number of keys that were thrown away.

We claim:

1. A method of securely communicating amongst respective users over communications media, comprising the steps of:

selecting N encryption keys such that all encryption keys have the same length;

assigning to each user a subset of the N keys by associating with each user a set of indices and assigning to each user the encryption keys having the indices associated with that user;

verifying that every pair of users that are to communicate with each other shares some set of encryption keys that are not shared by another user;

so long as every pair of users shares a set of encryption keys, distributing the N encryption keys to the users;

making the identities of the assigned key indices available to all communicating users; and a sending user encrypting a message using a key shared with a recipient user of the message, where the encryption key is determined from a shared key index.

2. A method as in claim 1, wherein the encryption key selecting step comprises the step of randomly selecting the N encryption keys.

3. A method as in claim 1, wherein the key subset assigning step comprises the step of assigning a random subset of the N encryption keys to each user, where the number of encryption keys in the random subset is approximately C times the square root of N, where C is related to the number of keys shared by respective users.

4. A method as in claim 1, wherein the encryption keys are distributed to the users by generating N random seeds for a pseudorandom number generator and distributing the generated seeds to the users.

5. A method as in claim 1, wherein the step of making the identities of the assigned key indices available comprises at least one of the following steps: (a) posting the indices of the encryption keys received by each communicating user in a place accessible to each communicating user, and (b) sending the indices of the encryption keys received by each communicating user to each other communicating user.

6. A method as in claim 1, wherein the sending user encrypts a message to the recipient user by identifying the keys shared between the sending user and the recipient user, taking a bitwise exclusive-OR of some of the shared keys to arrive at a key K, and taking the bitwise exclusive-OR of the key K with the bits of the message, where the length of key K is greater than or equal to the length of the message.

7. A method as in claim 6, wherein if the message has a length less than key K, the step of encrypting a message further comprises the step of padding the message with zeros before encryption.

8. A method as in claim 1, comprising the further steps of discarding any encryption key used to encrypt the message and obtaining new encryption keys.

9. A method as in claim 8, wherein the new encryption keys are distributed either every time encryption keys are discarded, on a periodic basis, or based on need.

10. A method as in claim 1, wherein the length of the encryption keys is variable and is determined by the typical message size for messages transmitted between the sending user and the recipient user for a particular application.

11. A method as in claim 1, wherein the length of the encryption keys is variable and is selected by the users based on the message size.

12. A method as in claim 1, wherein the encryption key selecting step comprises the step of using at least one trusted server to select and store the N encryption keys.

13. A method as in claim 1, comprising the step of adding a new user by assigning to the new user a random subset of the N encryption keys that is approximately C times the square root of N of the existing N encryption keys, where C is related to the number of encryption keys shared by respective users, and making the identities of the key indices assigned to the new user available to all users and vice-versa.

14. A method as in claim 1, wherein the encryption keys assigned to a user comprise encryption keys a and b and new encryption keys are calculated using keys a and b and distributed to the users by performing the steps of:

scanning color pictures to create data of size D;

for each bit i of each new encryption key from 1 to the length of the new encryption key, computing a+b*i and embedding the i'th bit of the new encryption key in the a+b*i modulo D location in the data D; and transmitting the data D with the new encryption keys embedded therein.

15. A method as in claim 1, comprising the further step of compressing the message before encrypting in the encrypting step.

16. A method as in claim 1, wherein the distributing step comprises the step of distributing to each user a number of encryption keys related to the number of users k that said each user is likely to communicate with.

17. A system that provides encryption keys to users so as to permit secure communications amongst respective users over communications media, comprising:

a key server programmed to select N encryption keys such that all encryption keys have the same length, to assign to each user a subset of the N keys by associating with each user a set of indices and assigning to each user the keys having the indices associated with that user, to verify that every pair of users that are to communicate with each other shares some set of encryption keys that are not shared by another user, to distribute the N encryption keys to the users so long as every pair of users shares a set of encryption keys, and to make the identities of the assigned key indices available to all communicating users; and a client that that encrypts a message using an encryption key shared between a sending user and a recipient user of the message, where the encryption key is determined from a shared key index.

18. A system as in claim 17, wherein the key server randomly selects the N encryption keys.

19. A system as in claim 17, wherein the key server assigns a random subset of the N encryption keys to each user, where the number of encryption keys in the random subset is approximately C times the square root of N, where C is related to the number of keys shared by respective users.

20. A system as in claim 17, wherein the key server distributes the encryption keys to the users by generating N random seeds for a pseudorandom number generator and distributing the generated seeds to the users.

21. A system as in claim 17, wherein the key server makes the identities of the assigned key indices available by posting the indices of the encryption keys received by each communicating user in a place accessible to each communicating user or sending the indices of the encryption keys received by each communicating user to each other communicating user.

22. A system as in claim 17, wherein the client encrypts a message to the recipient user by identifying the keys shared between the sending user and the recipient user, taking a bitwise exclusive-OR of some of the shared keys to arrive at a key K, and taking the bitwise exclusive-OR of the key K with the bits of the message, where the length of key K is greater than or equal to the length of the message.

23. A system as in claim 22, wherein if the message has a length less than key K, the client pads the message with zeros before encryption.

24. A system as in claim 17, wherein the client discards any encryption key used to encrypt the message and obtains new encryption keys from the key server to replenish its encryption keys.

25. A system as in claim 24, wherein the new encryption keys are distributed by the key server to the client either every time encryption keys are discarded, on a periodic basis, or based on need.

26. A system as in claim 17, wherein the length of the encryption keys is variable and is determined by the typical message size for messages transmitted between the sending user and the recipient user for a particular application.

27. A system as in claim 17, wherein the length of the encryption keys is variable and is selected by the users based on the message size.

28. A system as in claim 17, wherein the key server comprises at least one trusted server that selects and stores the N encryption keys.

29. A system as in claim 17, wherein the key server adds a new user by assigning to the new user a random subset of the N encryption keys that is approximately C times the square root of N of the existing N encryption keys in the system, where C is related to the number of encryption keys shared by respective users, and making the identities of the key indices assigned to the new user available to all users and vice-versa.

30. A system as in claim 17, wherein the key server distributes the encryption keys to the users by generating N random seeds for a pseudorandom number generator and distributing the generated seeds to the users.

31. A system as in claim 17, wherein the encryption keys assigned to a user comprise encryption keys a and b and the key server calculates using keys a and b and distributes new encryption keys to the users by scanning color pictures to create data of size D and, for each bit i of each new encryption key from 1 to the length of the new encryption key, computing $a+b*i$ and embedding the i'th bit of the new encryption key in the $a+b*i$ modulo D location in the data D, and transmitting the data D with the new encryption keys embedded therein.

32. A system as in claim 17, wherein the client includes means for compressing the message before encrypting the message.

33. A system as in claim 17, wherein the key server distributes to each user a number of encryption keys related to the number of users k that said each user is likely to communicate with.

34. A computer readable medium including stored thereon computer executable instructions that when executed by a computer causes the computer to enable respective users to securely communicate over communications media by performing the steps of:

selecting N encryption keys such that all encryption keys have the same length;

assigning to each user a subset of the N keys by associating with each user a set of indices and assigning to each user the encryption keys having the indices associated with that user;

verifying that every pair of users that are to communicate with each other shares some set of encryption keys that are not shared by another user;

so long as every pair of users shares a set of encryption keys, distributing the N encryption keys to the users; and making the identities of the assigned key indices available to all communicating users for use in encrypting messages, whereby a sending user encrypting a message uses a key shared with a recipient user of the message, where the encryption key is determined by the sending user from a shared key index.

* * * * *